(12) United States Patent
Mukai et al.

(10) Patent No.: US 11,467,179 B2
(45) Date of Patent: Oct. 11, 2022

(54) WIND ESTIMATION SYSTEM, WIND ESTIMATION METHOD, AND PROGRAM

(71) Applicant: RAKUTEN GROUP, INC., Tokyo (JP)

(72) Inventors: Hideaki Mukai, Tokyo (JP); Takayuki Kageyama, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 1165 days.

(21) Appl. No.: 15/781,469

(22) PCT Filed: Dec. 7, 2015

(86) PCT No.: PCT/JP2015/084336
§ 371 (c)(1),
(2) Date: Jun. 4, 2018

(87) PCT Pub. No.: WO2017/098571
PCT Pub. Date: Jun. 15, 2017

(65) Prior Publication Data
US 2019/0187168 A1    Jun. 20, 2019

(51) Int. Cl.
*G01P 5/02*        (2006.01)
*G01W 1/04*        (2006.01)
(Continued)

(52) U.S. Cl.
CPC .......... *G01P 13/045* (2013.01); *B64C 39/024* (2013.01); *G01P 5/02* (2013.01);
(Continued)

(58) Field of Classification Search
CPC ...... G01P 13/045; G01P 13/00; G01P 13/002; G01P 5/02; G01P 13/02; G01P 15/00;
(Continued)

(56) References Cited

U.S. PATENT DOCUMENTS

| | | | |
|---|---|---|---|
| 4,112,753 A | * | 9/1978 | Call .................... G01W 1/17 340/870.1 |
| 6,343,244 B1 | * | 1/2002 | Yoneda ................ G05D 1/105 701/472 |

(Continued)

FOREIGN PATENT DOCUMENTS

| | | |
|---|---|---|
| CN | 2771877 Y | 4/2006 |
| JP | 2011-246105 A | 12/2011 |

(Continued)

OTHER PUBLICATIONS

Office Action dated Oct. 9, 2019, for corresponding CN Patent Application No. 201580084979.8 and a partial translation of the Office Action.

*Primary Examiner* — Yoshihisa Ishizuka
*Assistant Examiner* — Carter W Ferrell
(74) *Attorney, Agent, or Firm* — HEA Law PLLC

(57) ABSTRACT

A wind direction and a wind speed are readily and accurately estimated at a desired position without using a wind direction and velocity sensor. Movement instruction means of a wind estimation system instructs an unmanned aerial vehicle (UAV), which includes a sensor unit that detects information about a position change, to move. Fall control means causes the UAV to free fall after the UAV is moved according to the instruction of the movement instruction means. Estimation means estimates at least one of a wind direction and a wind speed at a fall position based on the information about the position change detected by the sensor unit during a fall of the UAV.

7 Claims, 7 Drawing Sheets

(51) Int. Cl.
  *G05D 1/10* (2006.01)
  *B64C 39/02* (2006.01)
  *G01P 13/00* (2006.01)
  *G01W 1/08* (2006.01)
  *G01P 15/00* (2006.01)
  *G01P 13/04* (2006.01)

(52) U.S. Cl.
  CPC ............ *G01P 13/00* (2013.01); *G01P 13/002* (2013.01); *G01W 1/04* (2013.01); *G01W 1/08* (2013.01); *G05D 1/101* (2013.01); *G05D 1/105* (2013.01); *B64C 2201/125* (2013.01); *B64C 2201/145* (2013.01); *G01P 15/00* (2013.01); *Y02T 50/40* (2013.01)

(58) Field of Classification Search
  CPC ... G01P 5/01; G01P 5/00; G01P 5/001; B64C 39/024; B64C 2201/141; B64C 2201/146; B64C 2201/027; B64C 2201/125; B64C 2201/145; B64C 39/02; B64C 13/20; G01W 1/08; G01W 1/04; G01W 1/00; G01W 1/02; G05D 1/101; G05D 1/105; Y02T 50/40
  See application file for complete search history.

(56) References Cited

U.S. PATENT DOCUMENTS

| | | |
|---|---|---|
| 2011/0295569 A1 | 12/2011 | Hamke et al. |
| 2015/0027220 A1 | 1/2015 | Halfon et al. |
| 2017/0043867 A1* | 2/2017 | Ulrich .................. B64C 39/024 |

FOREIGN PATENT DOCUMENTS

| | | | |
|---|---|---|---|
| JP | 2012083318 A | * | 4/2012 |
| JP | 2015-512031 A | | 4/2015 |

* cited by examiner

WIND ESTIMATION SYSTEM, WIND ESTIMATION METHOD, AND PROGRAM

CROSS REFERENCE TO RELATED APPLICATIONS

This application is a National Stage of International Application No. PCT/JP2015/084336 tiled on Dec. 7, 2015. The contents of the above document is incorporated herein by reference in its entirety.

TECHNICAL FIELD

The present invention relates to a wind estimation system, a wind estimation method, and a program.

BACKGROUND ART

There are known techniques for measuring a wind direction and a wind speed using a wind direction and velocity sensor. For example, Patent Literature 1 describes a method of dropping the device including the wind direction and velocity sensor and the altimeter to measure a wind direction and a wind speed at each point on the dropping trajectory. For example, Patent Literature 2 describes the method of estimating speed of wind based on the difference between the acceleration detected by the unmanned aerial vehicle (UAV) in flight and the acceleration modeled based on parameters, such as a fan rotational speed of the UAV in flight and the UAV's speed, direction, and pitch, roll, yaw angles.

CITATION LIST

Patent Literature

Patent Literature 1: JP2015-512031A
Patent Literature 2: JP2011-246105A

SUMMARY OF INVENTION

Technical Problem

In Patent Literature 1, the wind direction and velocity sensor is required for detecting a wind direction and a wind speed. Further, since the device is dropped in the air to fall, it is difficult to determine the wind direction and the wind speed at the desired position. In Patent Literature 2, although a wind direction and a wind speed may be estimated without the wind direction and velocity sensor, there is a possibility that the wind direction and the wind speed may not be properly estimated, because modeling acceleration requires a lot of parameters and thus it takes much time and effort, and the estimation results may include errors if the parameters used for the modeling are different from the actual acceleration.

One or more embodiments of the present invention have been conceived in view of the above, and an object thereof is to readily and accurately estimate a wind direction and a wind speed at a desired position without using a wind direction and velocity sensor.

Solution to Problem

In order to solve the above described problems, a wind estimation system according to the present invention includes movement instruction means for instructing an unmanned aerial vehicle (UAV) to move, the UAV including a sensor unit that detects information about a position change, fall control means for causing the UAV to free fall after the UAV moves according to an instruction of the movement instruction means, and estimation means for estimating at least one of a wind direction and a wind speed at a fall position based on the information about the position change detected by the sensor unit during a fall of the UAV.

A wind estimation method according to the present invention includes a movement instruction step of instructing a UAV to move, the UAV including a sensor unit that detects information about a position change, a fall control step of causing the UAV to free fall after the UAV moves according to the instruction in the movement instruction step, and an estimation step of estimating at least one of a wind direction and a wind speed at a fall position based on the information about the position change detected by the sensor unit during a fall of the UAV.

A program according to the present invention causes a computer to function as movement instruction means for instructing a UAV to move, the UAV including a sensor unit that detects information about a position change, fall control means for causing the UAV to free fall after the UAV moves according to the instruction of the movement instruction means, and estimation means for estimating at least one of a wind direction and a wind speed at a fall position based on the information about the position change detected by the sensor unit during a fall of the UAV.

An information storage medium according to the present invention is a computer-readable information storage medium, that stores the program.

In an aspect of the present invention, the wind estimation system further includes stop determining means for determining whether the UAV is stopped. The fall control means causes the UAV to free fall when the stop determining means determines that the UAV is stopped.

In an aspect of the present invention, the sensor unit further detects information about an attitude of the UAV. The wind estimation system further includes first attitude determining means for determining whether the attitude of the UAV is at a predetermined attitude based on the information about the attitude detected by the sensor unit. The fall control means causes the UAV to free fall when the first attitude determining means determines that the attitude of the UAV is at the predetermined attitude.

In an aspect of the present invention, the sensor unit further detects information about an attitude of the UAV. The wind estimation system further includes second attitude determining means for determining whether the attitude of the UAV during a fall is within a predetermined range based on the information about the attitude detected by the sensor unit. When the second attitude determining means determines that the attitude of the UAV is within the predetermined range, the estimation means estimates at least one of a wind direction and a wind speed at a fall position based on the information about the position change detected by the sensor unit.

In an aspect of the present invention, the sensor unit further detects information about a distance between the UAV and a ground or an obstacle. The wind estimation system further includes distance determining means for determining whether the distance between the UAV and the ground or the obstacle, during a fall, is less than a predetermined distance based on the information about the distance detected by the sensor unit, and resume control means for resuming flight of the UAV when the distance determining means determines that the distance is less than the predetermined distance.

In an aspect of the present invention, the sensor unit further detects information about an attitude of the UAV. The wind estimation system further includes second attitude determining means for determining whether the attitude of the UAV during a fall is within the predetermined range based on the information about the attitude detected by the sensor unit, and resume control means for resuming flight of the UAV when the second attitude determining means determines that the attitude is within the predetermined range.

In an aspect of the present invention, the wind estimation system further includes measuring position receiving means for receiving, from a user, an instruction of a location to measure wind. The movement instruction means instructs the UAV to move to the location instructed by the user. The fall control means causes the UAV to free fall after the UAV is moved to the location instructed by the user.

In an aspect of the present invention, the wind estimation system further includes direction receiving means for receiving, from a user, an instruction of a direction to move the UAV. The movement instruction means instructs the UAV to move in the direction specified by the user. The fall control means causes the UAV to free fall after the UAV moves in the direction specified by the user.

Advantageous Effects of Invention

According to the present invention, it is possible to readily and accurately estimate a wind direction and a wind speed at a desired position without using a wind direction and velocity sensor.

DESCRIPTION OF EMBODIMENTS

[1. Hardware Configuration of Wind Estimation System]

Figure 1:
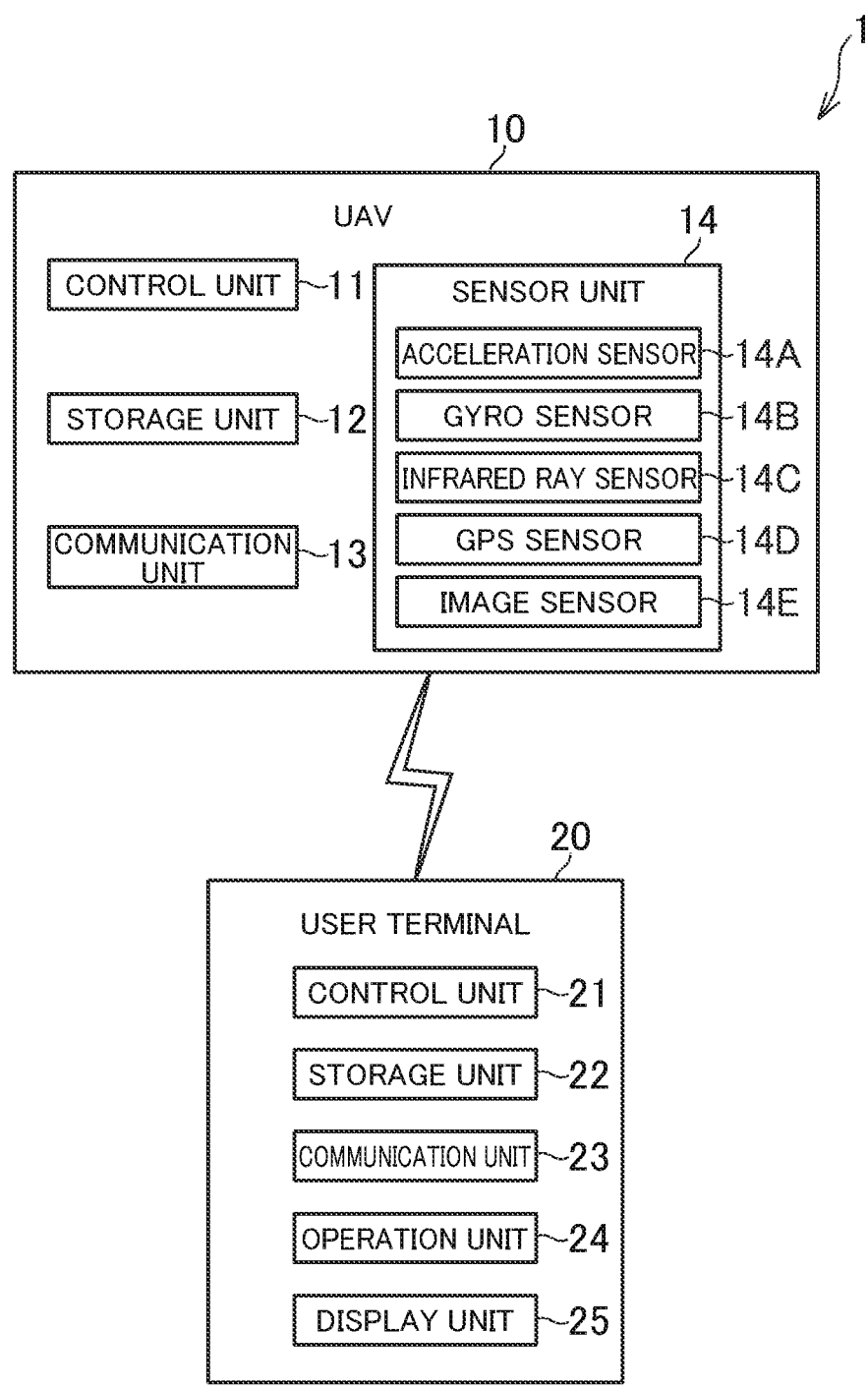
FIG. 1 is a diagram illustrating an overall configuration of a wind estimation system according to an embodiment.

In the following, an example of an embodiment of the wind estimation system according to the present invention will be described. In this embodiment, features of the wind estimation system will be described using an example of a case where a user playing golf measures wind at any position on a golf course. FIG. 1 is a diagram illustrating an overall configuration of the wind estimation system according to the embodiment. As shown in FIG. 1, the wind estimation system 1 includes an unmanned aerial vehicle (UAV) 10 and a user terminal 20. The UAV 10 and a user terminal 20 are connected to each other such that data can be transmitted and received.

The UAV 10 is an unmanned aircraft driven by a battery (what is called "drone") or by an engine, for example. The UAV 10 includes a control unit 11, a storage unit 12, a communication unit 13, and a sensor unit 14. The UAV 10 also includes general hardware, such as propellers, a motor, and a battery, which are omitted here.

The control unit 11 includes, for example, one or more microprocessors. The control unit 11 executes processing according to programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a flash memory. The communication unit 13 includes a network card for wireless communications. The communication unit 13 sends and receives data through a network.

The sensor unit 14 detects information about a position change (movement). For example, information about a position change is acceleration, velocity, or a travel distance of the UAV 10. In this embodiment, a case will be explained in which information about a position change is acceleration. As shown in FIG. 1, the sensor unit 14 includes an acceleration sensor 14A that detects acceleration of a predetermined number of axes (here, three axes). Various known acceleration sensors, such as an optical acceleration sensor and a semiconductor acceleration sensor, may be applied to the acceleration sensor 14A.

In this embodiment, a case will be explained in which the sensor unit 14 further detects information about an attitude of the UAV 10. For example, information about an attitude includes an angular velocity and an angle of the UAV 10. In this embodiment, a case will be explained in which information about an attitude is angular velocity. For example, the sensor unit 14 includes a gyro sensor 14B that detects angular velocity. Various known gyro sensors, such as an optical gyro sensor and a mechanical gyro sensor, may be applied to the gyro sensor 14B.

In this embodiment, a case will be explained in which the sensor unit 14 further detects information about a distance between the UAV 10 and the ground or an obstacle. For example, information about a distance may be a distance itself, or a flying time of infrared rays. In this embodiment, a case will be described in which information about a distance is a distance itself. For example, the sensor unit 14 includes an infrared ray sensor 14C that detects a distance to an object (e.g., the ground or an obstacle) using infrared rays. Various known infrared ray sensors, such as a quantum type infrared sensor and a thermal infrared sensor, may be applied to the infrared ray sensor 14C.

The sensors included in the sensor unit 14 are not limited to the above examples, but any sensor may be included. For example, as shown in FIG. 1, the sensor unit 14 may include a GPS sensor 14D that receives signals from satellites and an image sensor 14E used in digital cameras and video cameras. As another example, the sensor unit 14 may include a magnetic field sensor for specifying a direction, an altitude sensor for specifying an altitude, or a displacement sensor for specifying a displacement.

The user terminal 20 is a computer operated by a user, such as a personal computer, a mobile information terminal (including a tablet computer), and a mobile phone (including a smartphone). The user terminal 20 includes a control unit 21, a storage unit 22, a communication unit 23, an operation unit 24, and a display unit 25. The hardware configuration of the control unit 21, the storage unit 22, and the communication unit 23 is the same as that of the control unit 11, the storage unit 12, and the communication unit 13, and thus their overlapping explanation will be omitted.

The operation unit 24 is an input device for a user to perform operations, and includes a pointing device, such as a touch panel and a mouse, and a keyboard. The operation unit 24 sends operations of a user to the control unit 21. The display unit 25 is, for example, a liquid crystal display or an organic EL display. The display unit 25 displays a screen according to instructions from the control unit 21.

The programs and data described as being stored in the storage unit 12 or the storage unit 22 may be provided to the storage unit 12 or the storage unit 22 through a network. The hardware configuration of the UAV 10 and the user terminal 20 is not limited to the above examples, and hardware of various types of computers can be applied. For example, the UAV 10 and the user terminal 20 may each include a reader (e.g., an optical disc drive or a memory card slot) for reading a computer-readable information storage medium. In this case, programs and data stored in the information storage medium may be provided to the storage unit 12 or the storage unit 22 through the reader.

In the wind estimation system 1 according to this embodiment, when the UAV 10 free falls at a measuring position above a golf course specified by a user, a wind direction and a wind speed can be readily and accurately estimated without using a wind direction and velocity sensor by detecting how far the UAV 10 is blown away by the wind. The details of the technique will be described below.

[2. Functions Executed in Wind Estimation System]

Figure 2:
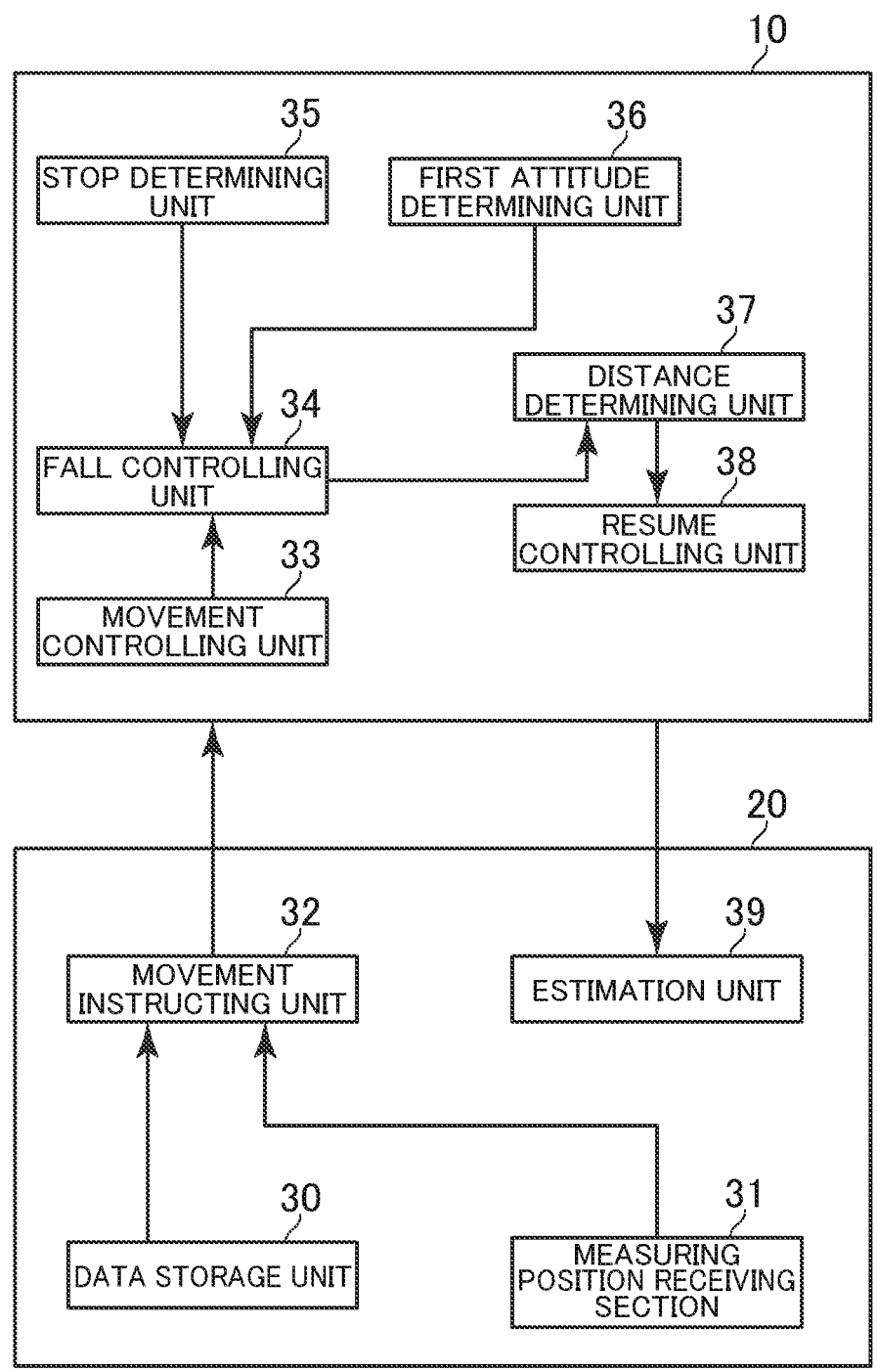
FIG. 2 is a functional block diagram showing an example of functions implemented in the wind estimation system.

FIG. 2 is a functional block diagram showing an example of functions executed in the wind estimation system 1. As shown in FIG. 2, in this embodiment, a movement controlling unit 33, a fall controlling unit 34, a stop determining unit 35, a first attitude determining unit 36, a distance determining unit 37, and a resume controlling unit 38 are implemented in the UAV 10, and a data storage unit 30, a measuring position receiving section 31, a movement instructing unit 32, and an estimation unit 39 are implemented in the user terminal 20.

[2-1. Data Storage Unit]

The data storage unit 30 is implemented mainly by the storage unit 22. The data storage unit 30 stores data necessary for measuring wind. Here, golf course data relating to a golf course is taken as an example of data stored in the data storage unit 30. The golf course data includes a map image indicating a course map of the golf course and association between positions in the map image and latitude/longitude information. The data stored in the data storage unit 30 is not limited to the above example. For example, the data storage unit 30 may store numerical formulas and tables necessary for estimating a wind direction and a wind speed. As another example, an altitude of a measuring position is a fixed value in this embodiment as described later, and thus the data storage unit 30 may store altitude information for specifying the altitude.

[2-2. Measuring Position Receiving Section]

The measuring position receiving section 31 is implemented mainly by the control unit 21. The measuring position receiving section 31 receives a measuring position of wind specified by a user. The measuring position is specified using the operation unit 24.

The measuring position is a three-dimensional position in a real space. In this embodiment, the measuring position is specified by the latitude/longitude information and the altitude information. The latitude/longitude information is information for specifying a position in a north-south direction and a position in an east-west direction on the earth, and indicated by, for example, respective values of degree, minute, and second. The altitude information is information indicating a height from a predetermined position. Here, a height from the ground is described, although a height may indicate height above sea level. As another example, there is a case where an obstacle exists between the UAV 10 and the ground. In this case, the altitude information may indicate a height from the obstacle. In this embodiment, a case will be described in which a user specifies latitude/longitude information, and altitude information has a fixed value (e.g., 20 m from the ground), although the user may specify altitude information.

Figure 3:
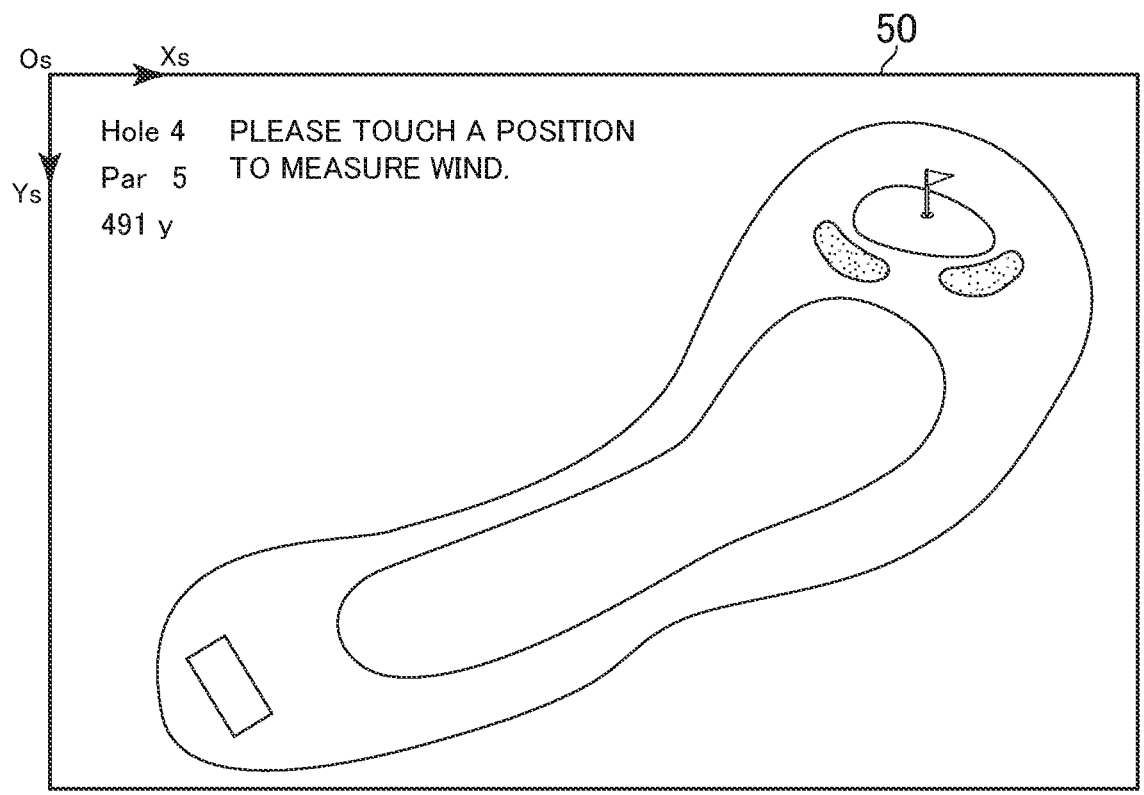
FIG. 3 is a diagram illustrating a scene in which a user specifies a measuring position.

FIG. 3 is a diagram illustrating a scene in which a user specifies a measuring position. As shown in FIG. 3, a map image 50 of the golf course in which the user is playing is displayed on the display unit 25 of the user terminal 20 based on the golf course data. The measuring position receiving section 31 acquires a position specified by the user on the map image 50 based on a detection signal from the operation unit 24. Here, the measuring position receiving section 31 receives the specified two-dimensional coordinates of a screen coordinate system (Xs-Ys coordinate system) having an origin Os set to the top left of the map image 50.

[2-3. Movement Instructing Unit]

The movement instructing unit 32 is implemented mainly by control unit 21. The movement instructing unit 32 instructs the UAV 10 to move. The UAV 10 has the sensor unit 14 that detects information about a position change. The movement instructing unit 32 indicates a position or a direction in which the UAV 10 moves. For example, the movement instructing unit 32 sends the latitude/longitude information and the altitude information to the UAV 10, thereby indicating the position to move, and sends, to the UAV 10, vector information of the direction in which the UAV 10 moves, thereby indicating the direction. These instructions may be performed by sending data in a predetermined format.

In this embodiment, a case will be described in which the movement instructing unit 32 instructs the UAV 10 to move to the measuring position specified by the user. For example, the movement instructing unit 32 acquires the measuring position based on the two-dimensional coordinates specified by the user on the map image 50. More specifically, the movement instructing unit refers to the golf course data and acquires the latitude/longitude information, which is associated with the two-dimensional coordinates on the map image 50 specified by the user, and the predetermined altitude information, as the measuring position.

[2-4. Movement Controlling Unit]

The movement controlling unit 33 is implemented mainly by the control unit 11. The movement controlling unit 33 moves the UAV 10 based on an instruction from the movement instructing unit 32. For example, the movement controlling unit 33 adjusts a rotational direction and a rotational speed of each propeller of the UAV 10 so that the UAV 10 moves to the position or in the direction indicated by the movement instructing unit 32. A rotational direction and a rotational speed of each propeller may be adjusted by changing parameters indicating directions and speed. Various known methods may be applied to the method of moving the UAV 10 to the specified position or direction. For example, the movement controlling unit 33 reduces the number of rotations of the propellers in the direction of the movement.

In this embodiment, a user specifies a measuring position, and the movement controlling unit 33 moves the UAV 10 to the measuring position indicated by the movement instructing unit 32. For example, the movement controlling unit 33 moves the UAV 10 in a direction from the latitude/longitude information determined by a signal received by the GPS sensor 14D to the latitude/longitude information indicated by the movement instructing unit 32. Further, for example, the movement controlling unit 33 adjusts an altitude of the UAV 10 such that a difference between a distance from the ground detected by the infrared ray sensor 14C and the altitude information is less than a threshold value. When the movement controlling unit 33 moves the UAV 10 to the measuring position, the movement controlling unit 33 may operate the UAV 10 to hover in the air or move upward so as to ensure a sufficient altitude.

[2-5. Fall Controlling Unit]

The fall controlling unit 34 is implemented mainly by the control unit 11. After the UAV 10 is moved according to the instruction from the movement instructing unit 32, the fall controlling unit 34 causes the UAV 10 to free fall. In this embodiment, the UAV 10 that flies by rotating propellers is taken as an example. As such, the fall controlling unit 34 causes the UAV 10 to free fall by stopping the propellers or making the rotational speed less than the threshold value. The propellers may be stopped by executing a command for stopping the propellers (a command for stopping a motor) or setting a parameter indicating the rotational speed of the propellers to 0. The rotational speed of the propellers may be reduced by reducing the parameter indicating the rotational speed of the propellers.

In this embodiment, a user specifies a measuring position, and thus, after the UAV 10 moves to the measuring position specified by the user, the fall controlling unit 34 causes the UAV 10 to free fall. The fall controlling unit 34 may determine whether the UAV is moved to the measuring position based on a detection result of the sensor unit 14. For example, the fall controlling unit 34 may determine that the UAV 10 is moved to the measuring position when a difference between the latitude/longitude information determined by a signal received by the GPS sensor 14D and the latitude/longitude information indicated by the movement instructing unit 32 is less than a threshold value, and a difference between a distance from the ground detected by the infrared ray sensor 14C and the altitude information is less than a threshold value. If it is not determined that the UAV 10 is moved to the measuring position, the fall controlling unit 34 does not cause the UAV 10 to free fall. If it is determined that the UAV 10 is moved to the measuring position, the fall controlling unit 34 causes the UAV 10 to free fall.

[2-6. Stop Determining Unit]

The stop determining unit 35 is implemented mainly by the control unit 11. The stop determining unit 35 determines whether the UAV 10 is stopped. The stop determining unit 35 determines whether the UAV 10 is stopped based on the detection result of the sensor unit 14. The stop determining unit 35 may determine that the UAV 10 is stopped when information about a position change detected by the sensor unit 14 is less than a threshold value. For example, the stop determining unit 35 determines that the UAV 10 is stopped when the acceleration detected by the acceleration sensor 14A is less than the threshold value.

The method of determining that the UAV 10 is stopped is not limited to the method using the acceleration sensor 14A. For example, the stop determining unit 35 may determine whether a change in a distance detected by the infrared ray sensor 14C is less than a threshold value. Further, for example, the stop determining unit 35 may determine whether a change in latitude/longitude information detected by the GPS sensor 14D is less than a threshold value, or determine whether a change in an image captured by the image sensor 14E is less than a threshold value. Further, the stop determining unit 35 may determine that the UAV 10 is stopped when a state in which the changes in acceleration, distance, and latitude/longitude information are less than the threshold values continues for a predetermined period of time. As another example, the stop determining unit 35 may determine whether the UAV 10 is stopped based on the parameter of the rotational speed of the propellers.

In this embodiment, the fall controlling unit 34 does not cause the UAV 10 to free fall if the stop determining unit 35 does not determine that the UAV 10 is stopped, and causes the UAV 10 to free fall if the stop determining unit 35 determines that the UAV 10 is stopped. In other words, the fall controlling unit 34 suspends the free fall of the UAV 10 until the stop determining unit 35 determines that the UAV 10 is stopped.

[2-7. First Attitude Determining Unit]

The first attitude determining unit 36 is implemented mainly by the control unit 11. The first attitude determining unit 36 determines whether an attitude of the UAV 10 is a predetermined attitude based on information about the attitude detected by the sensor unit 14. The first attitude determining unit 36 may determine whether a difference between the information about the attitude and the predetermined attitude is less than a threshold value. In this embodiment, the first attitude determining unit 36 determines whether an attitude determined by the detection result of the gyro sensor 14B is the predetermined attitude.

The predetermined attitude may be any attitude that is determined in advance, for example, an attitude of the UAV 10 where a difference between the longitudinal direction or the lateral direction of the aircraft and the horizontal plane of the real space is less than a threshold value. In this embodiment, the predetermined attitude corresponds to an attitude where a bank angle and a pitch angle of the UAV 10 are less than the threshold values.

Figure 4:
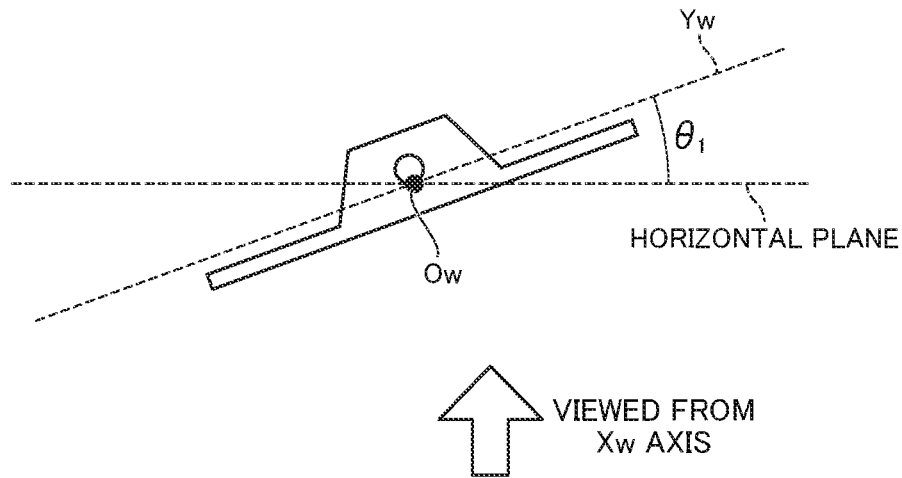
FIG. 4 is a diagram for explaining a determination method of a first attitude determining unit.
Figure 4:
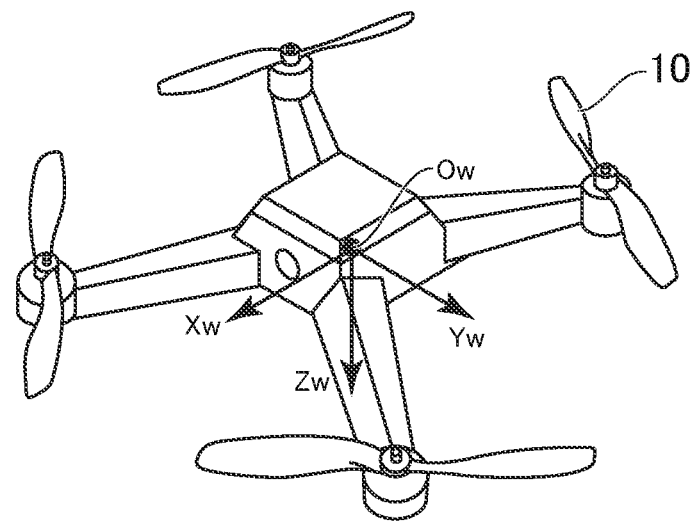
Figure 4:
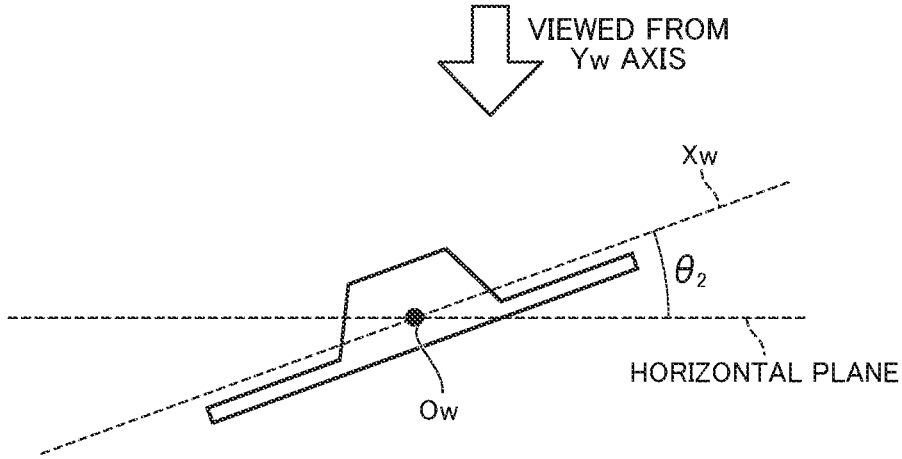

FIG. 4 is a diagram for explaining a determination method of the first attitude determining unit 36. In FIG. 4, the center of gravity of the UAV 10 is set to Ow, the longitudinal axis is Xw, the lateral axis is Yw, and the vertical axis is Zw. As shown in FIG. 4, when the UAV 10 is viewed from the direction of the longitudinal axis Xw, the bank angle $\theta_1$ is an angle formed by the Yw axis, which is the lateral axis of the aircraft, and the horizontal plane (the ground). In other words, the bank angle $\theta_1$ is an angle indicating a tilt of the aircraft in the lateral direction. The pitch angle $\theta_2$ is an angle formed by the Xw axis, which is the longitudinal axis of the aircraft, and the horizontal plane (the ground) when the UAV 10 is viewed from the lateral axis Yw. In other words, the pitch angle $\theta2$ is an angle indicating a degree of the nose (a predetermined part of the UAV 10) in the vertical direction. The first attitude determining unit 36 acquires the bank angle $\theta_1$ and the pitch angle $\theta_2$ from the detection result of the gyro sensor 14B, and, if the acquired bank angle $\theta_1$ and pitch angle $\theta_2$ are respectively less than the threshold values, determines that the attitude is the predetermined attitude.

In this embodiment, when the first attitude determining unit 36 determines that the attitude of the UAV 10 is the predetermined attitude, the fall controlling unit 34 causes the UAV 10 to free fall. In other words, if the first attitude determining unit 36 does not determine that the attitude of the UAV 10 is the predetermined attitude, the fall controlling unit 34 does not cause the UAV 10 to free fall, and suspends the free fall of the UAV 10 until the stop determining unit 35 determines that the UAV 10 is stopped.

The method of determining an attitude of the UAV 10 is not limited to the method using the gyro sensor 14B, but may be any method that uses content detected by the sensor unit 14. For example, the acceleration sensor 14A may be used in combination with the gyro sensor 14B, or an attitude may be determined based on changes in images captured by the image sensor 14E.

[2-8. Distance Determining Unit]

The distance determining unit 37 is implemented mainly by the control unit 11. The distance determining unit 37 determines whether a distance between the UAV 10 during a fall and the ground or an obstacle is less than a predetermined distance based on information about the distance detected by the sensor unit 14. The obstacle is an object existing in the direction in which the UAV 10 falls (i.e., an object with which the UAV 10 during a fall may come in contact), and includes, for example, a tree and a fence between the UAV 10 and the ground. In this embodiment, the distance determining unit 37 acquires a distance between the UAV 10 and the ground or an obstacle detected by the infrared ray sensor 14C. The infrared ray sensor 14C may detect a distance based on a flying time consumed for an infrared ray emitted to the ground or the obstacle (in a downward vertical direction, for example) to be reflected therefrom and returned. The predetermined distance may be any distance determined in advance, and may be a fixed value or a variable value. In the case of a variable value, such a value may be specified by an operation of a user, or defined based on a fall distance or fall velocity.

The determination method of the distance determining unit 37 is not limited to the above example, but may be any method that uses the detection result of the sensor unit 14. For example, the distance determining unit 37 may acquire and determine a distance to the ground or the obstacle based on an integral value of the acceleration sensor 14A, or estimate and determine the distance based on a picture of the ground or the obstacle captured by the image sensor 14E.

[2-9. Resume Controlling Unit]

The resume controlling unit 38 is implemented mainly by the control unit 11. When the distance determining unit 37 determines a distance is less than the predetermined distance, the resume controlling unit 38 resumes flight of the UAV. In other words, if the distance determining unit 37 does not determine that the distance is less than the predetermined distance, the resume controlling unit 38 does not resume flight of the UAV, and continues the free fall of the UAV. In this embodiment, the UAV 10 that flies by rotating propellers is taken as an example, and thus the resume controlling unit 38 resumes flight of the UAV 10 by starting rotation of the propellers or increasing the rotational speed. The propellers may be resumed by executing a command for starting rotation of propellers (a command for driving a motor), and the rotational speed may be increased by increasing a parameter indicating the rotational speed of the propellers.

[2-10. Estimation Unit]

The estimation unit 39 is implemented mainly by the control unit 11. The estimation unit 39 estimates at least one of a wind direction and a wind speed at a fall position based on information (acceleration in this embodiment) about a position change detected by the sensor unit 14 during the free fall of the UAV 10. In this embodiment, a case will be described in which the estimation unit 39 estimates both of a wind direction and a wind speed, although the estimation unit 39 may estimate only one of the wind direction and the wind speed. For example, the data storage unit 30 stores association of acceleration, a wind direction, and a wind speed, and the estimation unit 39 estimates the wind direction and the wind speed based on the association and the acceleration detected by the acceleration sensor 14A. Such association may be represented in data in a table format or in numerical formulas. Here, numerical formulas are used.

Figure 5:
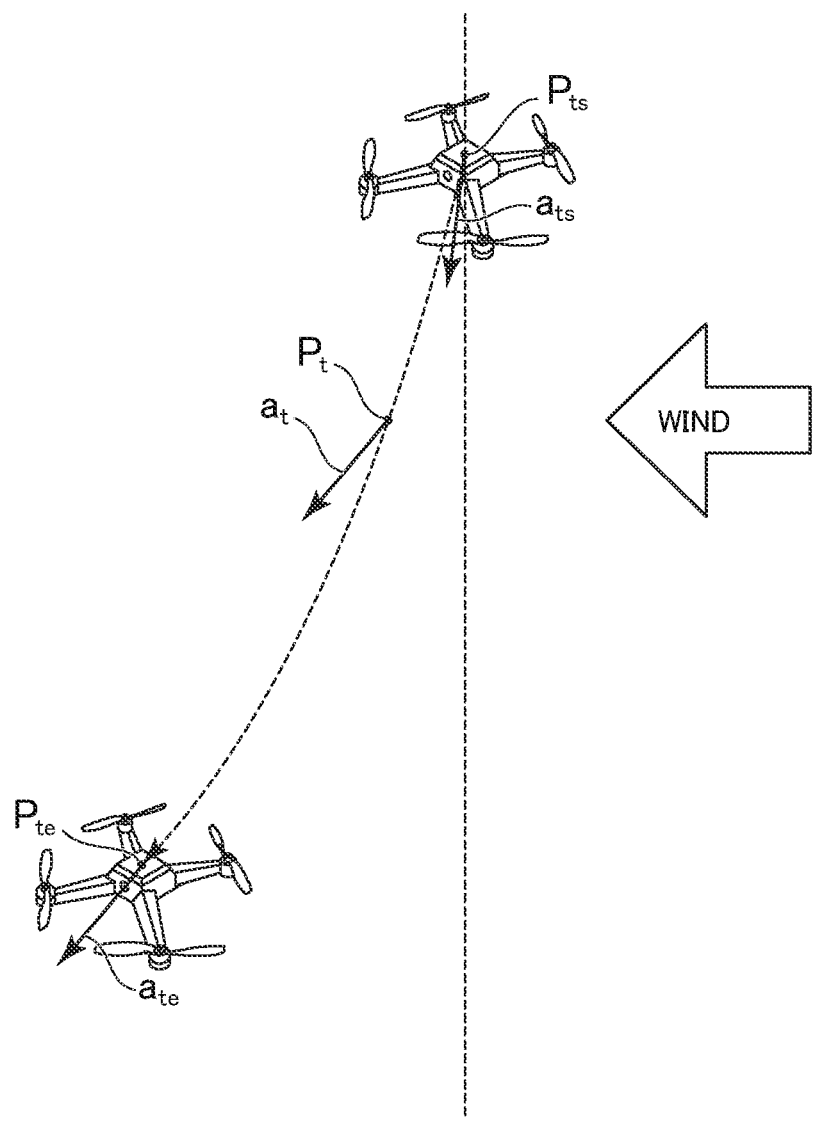
FIG. 5 is a diagram illustrating processing of an estimation unit.

FIG. 5 is a diagram illustrating processing of the estimation unit 39. In FIG. 5, $Pt_s$ is a position of the UAV 10 at the time is when the UAV 10 starts falling, $P_{te}$ is a position of the UAV 10 at the time to when measurement is completed, and Pt is a position of the UAV 10 at the time t during the fall. Here, the estimation unit 39 calculates average acceleration $a_{ave}$ of acceleration at detected at each position Pt from the position Pts (acceleration $a_{Ls}$) to the position $P_{Le}$ (acceleration $a_{Le}$). The average acceleration $a_{ave}$ is vector information, and indicates not only an amount of acceleration but also a direction of acceleration. The numerical formulas described above may be any numerical formulas determined in advance, although in this embodiment, the estimation unit 39 calculates wind speed V based on a formula 1 below defined by the fact that wind pressure is substantially in proportion to the square of wind speed, and a formula 2 defined by Newton's equation of motion. In the following, surface area S, coefficient C, mass m, and acceleration of gravity g are previously stored in the data storage unit 30. The wind direction may be determined to be a direction of a vector obtained by subtracting the acceleration of gravity g from the average acceleration $a_{ave}$. The wind direction may be specified with use of a magnetic field sensor, for example.

$$F=W*S=C*V^2*S \quad \text{(Formula 1)}:$$

$$F=m*(a_{ave}-g) \quad \text{(Formula 2)}:$$

F: wind pressure on UAV 10 [N]
W: wind pressure [N/m^2]
S: surface area of UAV [m^2]
C: coefficient (e.g., less than 1)
V: wind speed [m/s]
m: mass of UAV 10 [kg]
g: acceleration of gravity [m/s^2]

The wind speed V as estimated by the above estimation method will be described separately in a horizontal component and a vertical component. When the horizontal component of the wind speed V is large (i.e., side wind is strong), the UAV 10 is moved in the horizontal direction, and thus the horizontal component of the average acceleration $a_{ave}$ becomes large. As such, when the horizontal component of the average acceleration $a_{ave}$ is larger, it is estimated that the wind speed V in the horizontal direction is faster (i.e., side wind is strong). On the other hand, the vertical component of the average acceleration $a_{ave}$ has acceleration of gravity g even in a windless state, and thus a vertical component (i.e., blowing down or blowing up) of the wind speed V is represented by a difference between the vertical component of the average acceleration $a_{ave}$ and the acceleration of gravity g. As such, when a difference between the vertical component of the average acceleration $a_{ave}$ and the acceleration of gravity g is larger, it is estimated that a wind speed V in a direction indicated by the difference is faster (i.e., wind blowing down or wind blowing up is strong). The estimation method of the estimation unit 39 is not limited to the above example. The estimation unit 39 may perform estimation based on association of acceleration with a wind direction and a wind speed, and actual acceleration detected by the acceleration sensor 14A. For example, the estimation unit 39 may use numerical formulas other than those described above, or may use tables.

[3. Processing Executed in Wind Estimation System]

Figure 6:
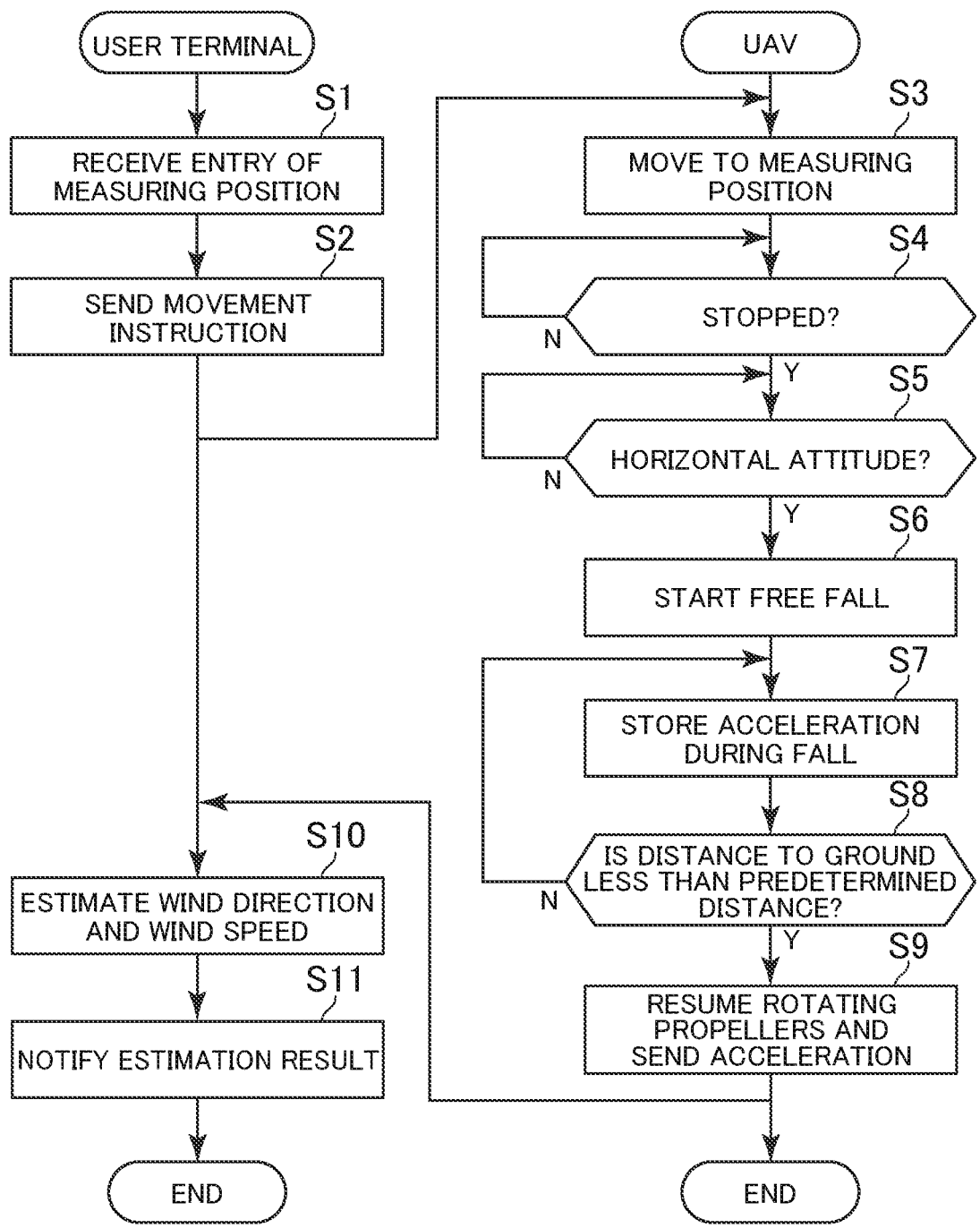
FIG. 6 is a flow chart showing an example of processing executed in the wind estimation system.

FIG. 6 is a flow chart showing an example of processing executed in the wind estimation system. The processing shown in FIG. 6 is executed when the control unit 11 operates in accordance with a program stored in the storage unit 12 and the control unit 21 operates in accordance with a program stored in the storage unit 22. In this embodiment, the processing described below is executed, and the functional block shown in FIG. 2 is thereby implemented.

As shown in FIG. 6, in the user terminal 20, the control unit 21 displays a map image 50 on the display unit 25 based on the golf course data stored in the storage unit 22, and receives a measuring position specified by a user based on a signal from the operation unit 24 (S1). In this embodiment, an altitude of a measuring position is set to a predetermined value, and thus the user uses the map image 50 to specify latitude/longitude information.

The control unit 21 sends a movement instruction to the UAV 10 to move to the measuring position specified by the user (S2). The movement instruction may be made by data in a predetermined format. In S2, referring to the golf course data, the control unit 21 acquires, as the measuring position, the latitude/longitude information associated with the two-dimensional coordinates specified by the user on the screen and the predetermined altitude information, and then sends the movement instruction.

When the UAV 10 receives the movement instruction, the control unit 11 moves the UAV 10 to the measuring position specified by the user (S3). In S3, the control unit 11 sets the latitude/longitude information and the altitude information included in the movement instruction as a destination, and starts moving the UAV 10.

The control unit 11 determines whether the UAV 10 is stopped at the measuring position based on a detection signal from the acceleration sensor 14A (S4). In S4, the control unit 11 determines whether the UAV 10 arrives at the measuring position based on the infrared ray sensor 14C and the GPS sensor 14D. The control unit 11 then determines whether the acceleration detected by the acceleration sensor 14A is less than the threshold value. If these two determinations are positive, it is determined that the UAV 10 is stopped at the measuring position.

If it is determined that the UAV 10 is stopped at the measuring position (S4;Y), the control unit 11 determines whether the UAV 10 is in a horizontal attitude based on a detection signal from the gyro sensor 14B (S5). The horizontal attitude is an attitude where the bank angle $\theta_1$ and the pitch angle $\theta_2$ shown in FIG. 4 are respectively less than the threshold values.

If it is not determined that the UAV 10 is in the horizontal attitude (S5;N), the processing returns to S5. In this case, the UAV 10 regains the attitude of the aircraft. On the other hand, if it is determined that the UAV 10 is in the horizontal attitude (S5;Y), the control unit 11 stops rotation of the propellers to start the free fall of the UAV 10 (S6). In S6, the control unit 11 sets the parameter indicating the rotational speed of the propellers to 0 or executes a command for stopping the propellers, thereby stopping the rotation of the propellers.

The control unit 11 stores acceleration during a fall detected by the acceleration sensor 14A in the storage unit 12 (S7). In S7, the control unit 11 stores acceleration in the storage unit 12 on a time series basis. The control unit 11 may send acceleration to the user terminal 20 at any time instead of storing acceleration in the storage unit 12.

The control unit 11 determines whether a distance between the UAV 10 and the ground or the obstacle is less than the predetermined distance based on the detection signal from the infrared ray sensor 14C (S8). If it is not determined that the distance between the UAV 10 and the ground or the obstacle is less than the predetermined distance (S8;N), the processing returns to S7, and the acceleration is stored. If it is determined that the distance between the UAV 10 and the ground or the obstacle is less than the predetermined distance (S8;Y), the control unit 11 resumes rotating the propellers, and sends the acceleration stored in the storage unit 12 to the user terminal 20 (S9). In S9, the control unit 11 sets the parameter indicating the rotational speed of the propellers to a predetermined number of rotations or more, or executes a command for rotating the propellers, thereby rotating the propellers.

When the user terminal 20 receives the acceleration, the control unit 21 estimates a wind direction and a wind speed (S10). In S10, the control unit 21 estimates the wind direction and the wind speed based on the method described by referring to FIG. 5. The control unit 21 displays the wind direction and the wind speed estimated in S10 on the display unit 25 (S11), and the processing terminates. The control unit 21 may notify the user of the wind direction and the wind speed in any ways, for example, by outputting the wind direction and the wind speed by speech, or sending the wind direction and the wind speed to the user's terminal.

According to the wind estimation system 1 as described above, a wind direction and a wind speed are estimated based on acceleration detected during the free fall of the UAV 10, and thus it is possible to readily and accurately estimate the wind direction and the wind speed at a desired position without using a wind direction and velocity sensor. Further, if a wind direction and velocity sensor is not mounted on the UAV 10, weight of the UAV 10 may be reduced.

When the UAV 10 is caused to fall before the UAV 10 is stopped, initial velocity is generated. If wind is estimated in view of the initial velocity, the processing may be complicated or accurate estimation may not be possible due to the error of the initial velocity. In the wind estimation system 1, the UAV 10 is caused to free fall when the UAV 10 is stopped, and thus it is possible to cause the UAV 10 to free fall with the initial velocity being substantially zero, and to more readily and accurately estimate a wind direction and a wind speed.

When the UAV 10 is viewed from the windward side, the surface area is changed according to the attitude of the UAV 10, and thus the effect of the wind received at the UAV 10 is changed according to the attitude. As such, if wind is estimated in view of the attitude, the processing may be complicated, or accurate estimation may not be possible due to errors. In this regard, in the wind estimation system 1, the UAV 10 starts free fall when the UAV 10 is in a predetermined attitude, and thus changes of the effect of wind due to the differences in attitudes can be made substantially zero, and the UAV can free fall always under the same condition. As such, it is possible to more readily and accurately estimate a wind direction and a wind speed.

In the wind estimation system 1, the UAV 10 resumes flight when a distance between the UAV 10 and the ground or an obstacle is less than a predetermined distance, which can prevent the UAV 10 from colliding with the ground or the obstacle.

In the wind estimation system 1, the UAV 10 moves to a measuring position specified by a user to measure wind, and thus the user can measure wind at a desired position. Further, the user may only specify the measuring position, and thus it is possible to reduce burden of operation on the user when measuring wind at the desired position.

[4. Variation]

The present invention is not to be limited to the above described embodiment and can be changed as appropriate without departing from the spirit of the invention.

Figure 7:
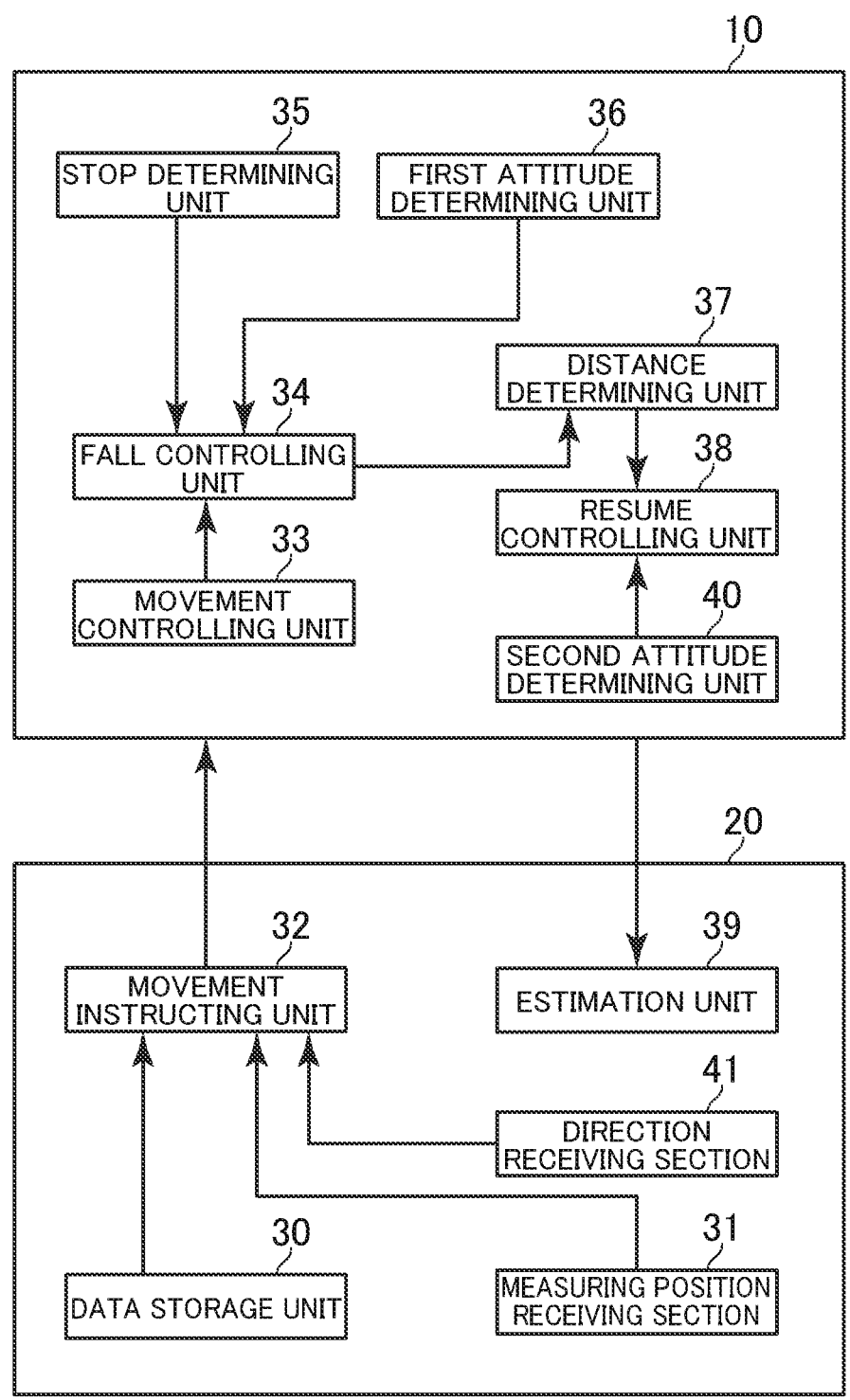
FIG. 7 is a functional block diagram of a variation.

FIG. 7 is a functional block diagram of a variation. As shown in FIG. 7, in the variations described below, a second attitude determining unit 40 (see variations (1) and (2)) and a direction receiving section 41 (see variation (3)) are implemented in addition to the functions of the embodiment.

(1) For example, when the UAV 10 is fanned by wind and the attitude is changed, the surface area of the UAV 10 viewed from the windward side is changed, and thus the effect of the wind on the UAV 10 is changed. For example, if the effect of the wind becomes stronger as the attitude of the UAV 10 is more collapsed compared with the horizontal attitude, the estimation result of a wind direction and a wind speed may include errors. As such, even during the fall of the UAV 10, the acceleration detected when the attitude is not in the given range is not considered because it is not reliable, and the acceleration detected when the attitude is in the given range may be only considered and used to estimate a wind direction and a wind speed because such acceleration is reliable.

The wind estimation system 1 of variation (1) includes the second attitude determining unit 40. The second attitude determining unit 40 is implemented mainly by the control unit 11. The second attitude determining unit 40 determines whether an attitude of the UAV 10 during a fall is in a predetermined range based on information about the attitude detected by the sensor unit 14. The predetermined range may be any range of attitude determined in advance, and an attitude that is different from a basic attitude by less than a threshold value. Here, a case will be described in which a predetermined range is a range where the bank angle $\theta_1$ and the pitch angle $\theta_2$ of the UAV 10 described in FIG. 4 is each less than the threshold value (e.g., less than 30°).

The estimation unit 39 estimates at least one of a wind direction and a wind speed at a fall position based on information about a position change detected by the sensor unit 14 when the second attitude determining unit 40 determines that the attitude is within the predetermined range. In other words, if the sensor unit 14 detects the information about the position change when the second attitude determining unit 40 does not determine that the attitude is within the predetermined range, the estimation unit 39 does not use such information to estimate a wind direction and a wind speed.

According to the variation (1), by using the detection result where the UAV 10 maintains a fixed attitude during the fall, a wind direction and a wind speed are estimated based on a highly reliable acceleration. As such, it is possible to reduce errors due to differences in attitudes, and to more readily and accurately estimate a wind direction and a wind speed.

(2) For example, during the free fall, the UAV 10 is easily fanned by the wind and the attitude is collapsed. As such, if the UAV 10 is turned upside down, the UAV 10 cannot resume flight and may collide with the ground or an obstacle. As such, the UAV 10 may resume flight when the attitude of the UAV 10 during a fall is not in the predetermined range (i.e., before the UAV 10 is about to be turned upside down).

The wind estimation system 1 of the variation (2) includes the second attitude determining unit 40. The second attitude determining unit 40 is as described in the variation (1). The resume controlling unit 38 causes the UAV 10 to resume flight when the second attitude determining unit 40 determines that the attitude is not within the predetermined range. In other words, when the second attitude determining unit 40 determines that the attitude is within the predetermined range, the resume controlling unit 38 does not cause the UAV 10 to resume flight and keeps the UAV 10 to free fall. The method of causing the UAV 10 to resume flight is the same as the method described in the embodiment.

According to the variation (2), it is possible to prevent a case where the UAV 10 is turned upside down and cannot resume flight, and results in a collision with the ground or an obstacle.

(3) For example, in the embodiment, the user specifies the measuring position on the map image 50 displayed on the display unit 25, although the user may manually move the UAV 10 with use of a remote control device for indicating a movement direction of the UAV 10.

The wind estimation system 1 of variation (3) includes the direction receiving section 41. The direction receiving section 41 is implemented mainly by the control unit 21. The direction receiving section 41 receives a movement direction of the UAV 10 specified by a user. Here, the operation unit 24 may be a controller for sending an instruction to the UAV 10 by waves, and includes an operating member for indicating a movement direction. The operating member may be a lever and a button. For example, a movement direction of the UAV 10 is determined based on a direction in which a lever is pulled or a type of a button that is pressed. Various known methods can be applied to the method of indicating a direction. In addition to the method using the operating member of the controller as described above, a direction may be indicated by tilting a smartphone or a tablet terminal held by a user, or touching a virtual button displayed on a touch panel.

The movement instructing unit 32 instructs the UAV 10 to move in a direction specified by a user. In other words, in variation (3), the direction specified by the user is included in a movement instruction. The movement controlling unit 33 moves the UAV 10 in the direction indicated by the movement instructing unit 32.

After the UAV 10 is moved in the direction specified by the user, the fall controlling unit 34 causes the UAV 10 to free fall. In variation (3), the fall controlling unit 34 may cause the UAV 10 to free fall when a predetermined condition is satisfied after the UAV 10 is moved in the direction specified by the user. The predetermined condition may include, for example, performing an operation of starting free fall by using the operation unit 24, and not indicating a direction for a predetermined period of time. As another example, when a user specifies altitude information, sometimes altitude information necessary for measuring wind may not be specified (e.g., 3 meters is specified for the UAV 10 that requires 20 meters of altitude to measure wind). As such, the predetermined condition may be a condition in which altitude information specified by a user has a threshold value or more. The fall controlling unit 34 does not cause the UAV 10 to free fall until the predetermined condition is satisfied, and causes the UAV 10 to free fall when the predetermined condition is satisfied.

According to variation (3), the UAV 10 is moved in the direction specified by the user to measure wind, and thus a position to measure wind can be more freely determined. Further, the user may only need to specify a direction, and thus it is possible to reduce burden of operation on the user when measuring wind at a desired position.

(4) For example, two or more of variations (1) to (3) may be combined.

For example, the case has been explained in which the estimation unit 39 uses acceleration to estimate a wind direction and a wind speed, although the estimation unit 39 may use velocity during a fall. In this case, the data storage unit 30 stores association of velocity with a wind direction and a wind speed, and the estimation unit 39 estimates a wind direction and a wind speed associated with the velocity detected by the sensor unit 14. For example, when a horizontal component of the movement velocity is larger, it is estimated that a wind speed in such a direction is faster. Further, when a difference between a vertical component of the movement velocity and the velocity by acceleration of gravity is larger, it is estimated that a wind speed in a direction corresponding to such a difference is faster. As another example, the estimation unit may use a travel distance during a fall. In this case, the data storage unit 30 stores association of a travel distance with a wind direction and a wind speed, the estimation unit 39 estimates a wind direction and a wind speed associated with the travel distance detected by the sensor unit 14. For example, when a horizontal component of a travel distance is larger, it is estimated that a wind speed in such a direction is faster. Further, when a difference between a vertical component of a travel distance and movement by acceleration of gravity is larger, it is estimated that a wind speed in a direction corresponding to such a difference is faster.

For example, in the above description, the UAV 10 that does not include a wind direction and velocity sensor is taken as an example, although the UAV 10 that includes a wind direction and velocity sensor may execute the processing described in the embodiment or the variations. In such a case, for example, even in the event of a breakdown of the wind direction and velocity sensor, the UAV 10 can estimate a wind direction and a wind speed.

For example, the functions described as being implemented in the UAV 10 may be implemented by the user terminal 20. For example, the fall controlling unit 34, the stop determining unit 35, the first attitude determining unit 36, the distance determining unit 37, the resume controlling unit 38, and the second attitude determining unit 40 may be implemented by the user terminal 20. In this case, these functions are implemented mainly by the control unit 21, and the fall controlling unit 34 and the resume controlling unit 38 each instructs the UAV 10 to start falling or resume flight. The stop determining unit 35, the first attitude determining unit 36, the distance determining unit 37, and the second attitude determining unit 40 may each acquire detection of the sensor unit 14 and perform determining processing. Further, the function described as being implemented by the user terminal 20 may be implemented by the UAV 10. For example, the data storage unit 30, the measuring position receiving section 31, the movement instructing unit 32, the estimation unit 39, and the direction receiving section 41 may be implemented by the UAV 10. In this case, the data storage unit 30 is implemented mainly by the storage unit 12, and the other functions are implemented mainly by the control unit 11. The measuring position receiving section 31 and the direction receiving section 41 may each receive instructions from the operation unit of the UAV 10. The movement instructing unit 32 may instruct its motor and propellers to move to a measuring position. The estimation unit 39 may estimate a wind direction and a wind speed based on the detection of the sensor unit 14 using the method described in the embodiment. The functions described in the above may be implemented only by the UAV 10, or shared between computers in the wind estimation system 1. In the functions described above, the functions other than the movement instructing unit 32, the fall controlling unit 34, and the estimation unit 39 may be omitted.

For example, although the case in which the wind estimation system 1 is used in a golf course is taken as an example, the wind estimation system 1 may be used for measuring wind at any position, and applied to various purposes other than golf. For example, the wind estimation system 1 may be used for measuring wind in sports or leisure other than golf, or measuring wind at any position, such as on the water.

The invention claimed is:

1. A wind estimation system comprising at least one processor configured to:
   instruct an unmanned aerial vehicle (UAV) to move, the UAV including a sensor unit that detects information about a position change;
   cause the UAV to free fall after the UAV moves according to an instruction; and
   estimate at least one of a wind direction and a wind speed at a fall position, based on the information about the position change detected by the sensor unit during a fall of the UAV;
   wherein the at least one processor determines whether the UAV is stopped and causes the UAV to free fall when it is determined that the UAV is stopped;
   wherein the sensor unit further detects information about an attitude of the UAV, and wherein the at least one processor:
     determines whether the attitude of the UAV, during a fall, is within a predetermined range, based on the information about the attitude detected by the sensor unit, and
     estimates at least one of a wind direction and a wind speed at a fall position, based on the information about the position change detected by the sensor unit, when it is determined that the attitude of the UAV is within the predetermined range.

2. The wind estimation system according to claim 1, wherein the sensor unit further detects information about a distance between the UAV and a ground or an obstacle, and wherein the at least one processor:
   determines whether the distance between the UAV and the ground or the obstacle, during a fall, is less than a predetermined distance based on the information about the distance detected by the sensor unit; and
   stops the fall and resumes flight of the UAV when it is determined that the distance is less than the predetermined distance.

3. The wind estimation system according to claim 1, wherein the at least one processor:
   receives, from a user, an instruction of a location to measure wind,
   instructs the UAV to move to the location specified by the user, and
   causes the UAV to free fall after the UAV is moved to the location specified by the user.

4. The wind estimation system according to claim 1, wherein the at least one processor:
   receives, from a user, an instruction of a direction to move the UAV,
   instructs the UAV to move in the direction specified by the user, and
   causes the UAV to free fall after the UAV is moved in the direction specified by the user.

5. A wind estimation system comprising at least one processor configured to:
  instruct an unmanned aerial vehicle (UAV) to move, the UAV including a sensor unit that detects information about a position change;
  cause the UAV to free fall after the UAV moves according to an instruction;
  estimate at least one of a wind direction and a wind speed at a fall position, based on the information about the position change detected by the sensor unit during a fall of the UAV;
  wherein the sensor unit further detects information about an attitude of the UAV, and wherein the at least one processor:
    determines whether the attitude of the UAV is at a predetermined attitude based on the information about the attitude detected by the sensor unit, and
    causes the UAV to free fall when it is determined that the attitude of the UAV is at the predetermined attitude.

6. A wind estimation system comprising at least one processor configured to:
  instruct an unmanned aerial vehicle (UAV) to move, the UAV including a sensor unit that detects information about a position change;
  cause the UAV to free fall after the UAV moves according to an instruction; and
  estimate at least one of a wind direction and a wind speed at a fall position, based on the information about the position change detected by the sensor unit during a fall of the UAV;
  wherein the sensor unit further detects information about an attitude of the UAV, and wherein the at least one processor:
    determines whether the attitude of the UAV, during a fall, is within the predetermined range based on the information about the attitude detected by the sensor unit; and
    resumes flight of the UAV when it is determined that the attitude is within the predetermined range.

7. A non-transitory computer-readable information storage medium for storing a program for causing a computer to:
  instruct a UAV to move, the UAV including a sensor unit that detects information about a position change;
  cause the UAV to free fall after the UAV moves according to the instruction; and
  estimate at least one of a wind direction and a wind speed at a fall position based on the information about the position change detected by the sensor unit during a fall of the UAV;
  wherein the computer determines whether the UAV is stopped and cause the UAV to free fall when it is determined that the UAV is stopped;
  wherein the sensor unit further detects information about an attitude of the UAV, and:
    determine whether the attitude of the UAV, during a fall, is within a predetermined range, based on the information about the attitude detected by the sensor unit, and
    estimate at least one of a wind direction and a wind speed at a fall position, based on the information about the position change detected by the sensor unit, when it is determined that the attitude of the UAV is within the predetermined range.

* * * * *